3,839,373
PERFLUOROALKYLALKYLMONOCARBOXYLIC ACID ESTERS DERIVED FROM CYCLOALIPHATIC EPOXIDES
Horst Jaeger, Bettingen, Switzerland, assignor to Ciba-Geigy AG, Basel, Switzerland
No Drawing. Filed Feb. 3, 1971, Ser. No. 112,442
Claims priority, application Switzerland, Feb. 9, 1970, 1,823/70
Int. Cl. C07c 69/62; D06m 13/20
U.S. Cl. 260—408                 15 Claims

ABSTRACT OF THE DISCLOSURE

Perfluoroalkylalkylmonocarboxylic acid esters are provided which are derived from cycloaliphatic epoxides. These esters contain at least one perfluoroalkyl radical with 4 to 14 carbon atoms which is bonded via an alkylene group with 1 to 10 carbon atoms to a carboxyl group which in turn is bonded in an ester-like manner to a cycloaliphatic radical. This radical contains in the 2-position to the ester group an optionally etherified or esterified hydroxyl group; said radical is bonded in turn directly or via a bridge member to an optionally etherified or esterified second hydroxyl group. The ether or ester radical is a saturated aliphatic radical which is optionally linked with a cycloaliphatic radical which in turn may be bonded via an ester bridge member and an alkylene group to a perfluoro alkyl radical.

---

The perfluoroalkylalkylmonocarboxylic acid esters are used to achieve oleophobic furnishes on porous or non-porous substrates, especially on fibrous materials, such as textiles and papers.

The subject of the invention are perfluoroalkylalkylmonocarboxylic acid esters, characterised in that they contain (a) at least one perfluoroalkyl radical with 4 to 14 carbon atoms, which is bonded via an alkylene group with 1 to 10 carbon atoms to a carboxyl group, which is bonded in an ester-like manner to (b) a cycloaliphatic radical which is substituted, in the position adjacent to the ester bridge, by an optionally etherified or esterified hydroxyl group, this radical being bonded in turn, directly or via a bridge member, to (c) an optionally etherified or esterified second hydroxyl group, with the ether radical or ester radical representing a saturated, aliphatic radical which is optionally linked via further ether bridges or ester bridges to a radical like (b), which is in turn bonded via an ester bridge to a radical like (a).

The alkylene group, via which the perfluoroalkyl radical is bonded to the carboxyl group, can be acyclic—branched or unbranched—or cyclic. The acylic radicals contain 1 to 10 carbon atoms, whilst the cycloalkylene radicals possess 5 or 6 ring carbon atoms. The ethylene, n-butylene, n-decylene, isopropylene or cyclohexylene radical may be mentioned as examples.

Preferably, these perfluoroalkylalkylmonocarboxylic acid esters correspond to the formula (I)

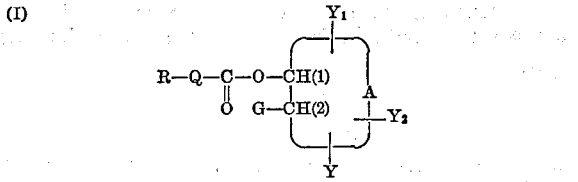

wherein R denotes a perfluoroalkyl radical with 4 to 14 carbon atoms, Q denotes an acyclic alkylene radical with 1 to 10 carbon atoms, preferably a n-alkylene radical, or a cycloalkylene radical with 5 or 6 ring carbon atoms, A and the mutually adjacent carbon atoms (1) and (2) together denote a saturated cycloaliphatic ring or a ring system with 5 to 10 ring carbon atoms, $Y_1$ denotes a hydroxyl group or a group of the formula (Ia)            —$CH_2$—Z wherein Z represents a hydroxyl group or an aliphatic or cycloaliphatic radical which is bonded to the —$CH_2$— group by an ether or ester bridge, or $Y_1$ denotes a group of the formula (Ib)

$$-C\underset{\diagdown O-Z_2}{\overset{\diagup O-Z_1}{H}}$$

wherein $Z_1$ and $Z_2$ each represent a monovalent aliphatic or cycloaliphatic radical, or together represent a bivalent aliphatic or cycloaliphatic radical, $Y_2$ denotes a hydrogen atom or a group of the formula —$CH_2$—Z—, wherein Z has the indicated meaning, and, where Z represents an aliphatic radical, the latter can also be conjoint with the radicals $Y_1$ and $Y_2$ in a group of the formula (Ic)

$$\diagup\!\!\!CH_2-O\diagdown\!\!\!\diagdown Z$$
$$\diagdown\!\!\!CH_2-O\diagup$$

X denotes a hydrogen atom or an alkyl or hydroxylalkyl radical with 1 to 4 carbon atoms and G denotes an aliphatic or cycloaliphatic radical which is bonded by an ether or ester bridge to the carbon atom (2), or preferably denotes a hydroxyl group. The alkyl radical Q is preferably a n-alkylene radical with 1 to 10 carbon atoms.

Compounds of particular interest are here perfluoroalkylalkylmonocarboxylic acid esters of the formula (II)

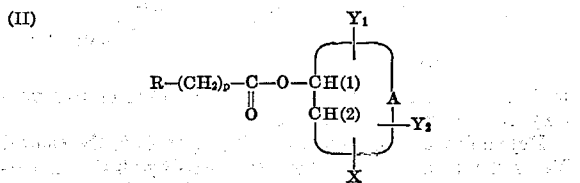

wherein p denotes an integer having a value of 1 to 10 and R, A, X, $Y_1$ and $Y_2$ have the indicated meaning. p preferably represents an integer from 2 to 4.

Very suitable compounds are above all also those of the formula (III)

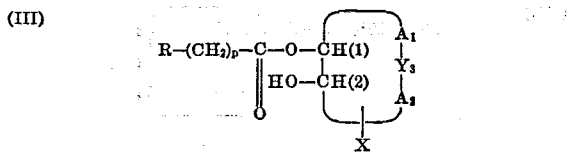

wherein R denotes a perfluoroalkyl radical with 4 to 14 carbon atoms, p denotes an integer having a value of 1 to 10, $A_1$ and $A_2$ together with the mutually adjacent carbon atoms (1) and (2) and the carbon atom (3) in the radical $Y_3$ denote a saturated cycloaliphatic ring with 5 or 6 ring carbon atoms or a bicyclic or tricyclic aliphatic ring system wtih 7 to 10 ring carbon atoms, $Y_3$ denotes a radical of the formula

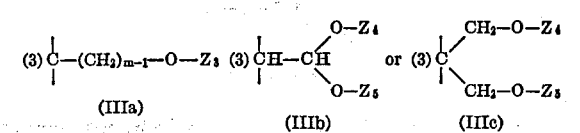

wherein $Z_3$ is a hydrogen atom, or an alkyl, hydroxyalkyl or acyl radical with 1 to 18 carbon atoms, which is optionally bonded via a second ether or ester bridge to a radical of the formula (IV)

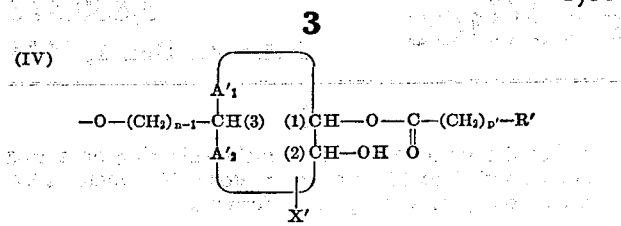

wherein X′, R′, p′, A′₁ and A′₂ have the meaning indicated for X₁, R, p′, A₁ and A₂, m and n are 1 or 2, and wherein Z₃ also represents a radical of the formula (V)

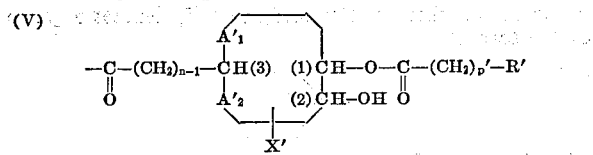

wherein X′, R′, p′, A′₁, A′₂ and n have the indicated meaning; and Z₄ and Z₅ each denote a hydrogen atom, or an alkyl, hydroxyalkyl, monoepoxyalkyl or acyl radical with 1 to 18 carbon atoms, or together denote a bivalent alkyl, epoxyalkyl or hydroxyalkyl radical with 1 to 18 carbon atoms, which is optionally bonded via one or two ether bridges or an ester bridge to Y, in the radical of the formula (VI)

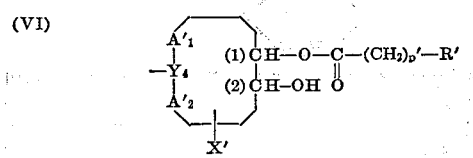

wherein X′, R′, p′, A′₁ and A′₂ have the indicated meaning, and Y₄ represents a radical of the formula

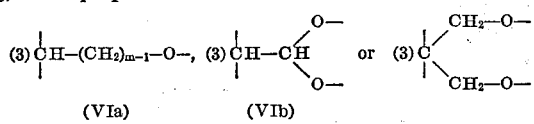

and X denotes a hydrogen atom or an alkyl or hydroxyalkyl radical with 1 to 4 carbon atoms.

Depending on the meaning of Z₃, Z₄ or Z₅ in the radical Y₃ of the formula (II), the perfluoroalkylalkylmonocarboxylic acid esters according to the invention are compounds with one or two perfluoroalkylalkylmonocarboxylic acid esters. However, preference is given to compounds with only one perfluoroalkylalkylmonocarboxylic acid radical, which correspond to the formula (VII)

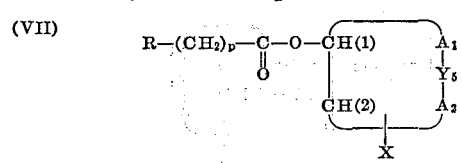

wherein X, R, p, A₁ and A₂ have the indicated meaning, the ring carbon atom (3) is located in the radical Y₅, and the latter represents a radical of the formula

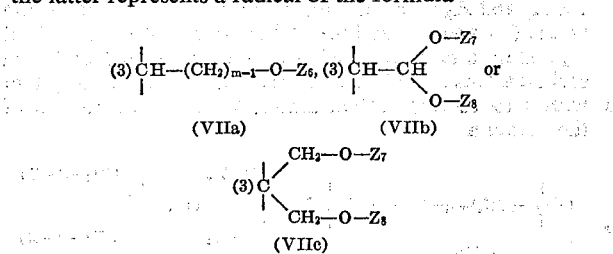

wherein Z₆, Z₇ and Z₈ each represent a hydrogen atom or an alkyl or acyl radical with 1 to 18 carbon atoms, or wherein Z₇ and Z₈ together represent a bivalent alkyl or hydroxyalkyl radical with 1 to 18 carbon atoms, and m is 1 or 2.

Very suitable perfluoroalkylalkylmonocarboxylic acid esters correspond to the formula (VIIIa)

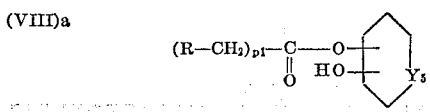

or especially to the formula (VIIIb)

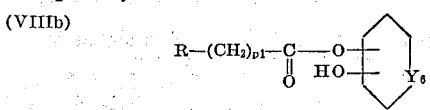

wherein R and Y₅ have the indicated meaning, p₁ is an integer having a value of 2 to 4, the perfluoroalkylalkylmonocarboxylic acid radical and the hydroxyl group are in the 3- and 4- position, or 4- and 3-position, relative to Y₆, and Y₆ represents a radical of the formula

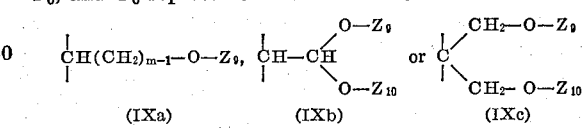

(IXa)    (IXb)    (IXc)

wherein Z₉ and Z₁₀ each denote a hydrogen atom, or an alkyl or hydroxyalkyl radical with 1 to 5 carbon atoms, and m denotes 1 or 2.

Good results are also achieved with perfluoroalkylalkylmonocarboxylic acid esters of the formula (X)

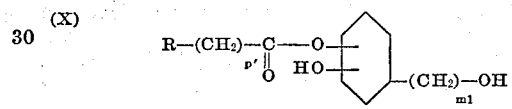

wherein R and p′ have the indicated meaning, m is 1 or 2, and the prefluoroalkylalkylmonocarboxylic acid radical and the hydroxy group are the 3- and 4-position, or 4- and 3-position.

A particularly advantageous perfluoroalkylalkylmonocarboxylic acid ester corresponds to the formula (XIa)

or (XIb)

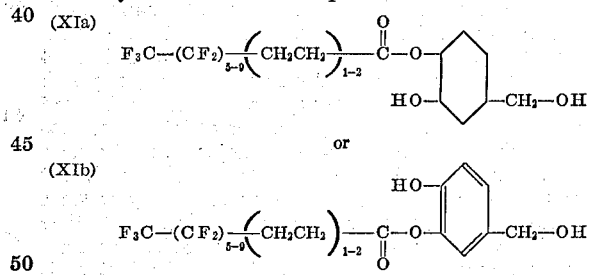

The perfluoroalkylalkylmonocarboxylic acid esters according to the invention are mostly isomer mixtures, in that during the preparation by opening an epoxide ring, the esterification with the perfluoroalkylalkylmonocarboxylic acid can optionally take place at either of the adjacent carbon atoms of the epoxide group. Single products are only obtained where the cycloaliphatic ring is symmetrically substituted relative to the epoxide group.

The perfluoroalkyl radical of the perfluoroalkylalkylmonocarboxylic acid esters according to the invention preferably contains 5 to 11, or especially 7 to 9, carbon atoms. The perfluoroalkyl radical can be either branched or unbranched, that is to say it is also possible for iso-perfluoroalkyl radicals, for example those of the formula (XII)

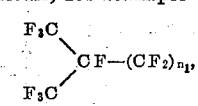

wherein n₁ represents an integar having a value of 1 to 11, to be present. However, n-perfluoroalkyl radicals are always preferred. Further, the perfluoroalkyl radical can also be a ω-H-perfluoroalkyl radical.

The perfluoroalkylalkylmonocarboxylic acid esters according to the invention are manufactured by (1) reacting a perfluoroalkylalkylmonocarboxylic acid which contains a perfluoroalkyl radical with 4 to 14 carbon atoms, which is bonded to the carboxyl group via an alkylene bridge with 1 to 10 carbon atoms, with (2) a cycloaliphatic 1,2-monoepoxide, which is bonded directly or via a bridge member to an optionally etherified or esterified second hydroxyl group, wherein the ether or ester radical represents a saturated aliphatic radical which is optionally linked via further ether or ester bridges to a second cycloaliphatic 1,2-monoepoxide, and optionally additionally etherifying or esterifying with an aliphatic or cycloaliphatic compound.

The perfluoroalkylethylmonocarboxylic acids used as starting materials are known from U.S. Pats. Nos. 2,951,051; 3,145,222 and 3,171,861. The cycloaliphatic epoxides are disclosed in e.g. U.S. Pats. Nos. 2,716,123; 2,750,395; 2,794,029; 2,977,374; 2,999,866; 3,023,174; 3,138,618; 3,210,379 and 3,402,153.

The compounds of the formula (I) are obtained if (1) a perfluoroalkylalkylmonocarboxylic acid of the formula (XIII)  R—Q—COOH, wherein R and Q have the indicated meaning, is reacted with (2) and epoxide of the formula (XIV) 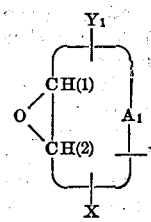

wherein $A_1$, X, $Y_1$ and $Y_2$ have the indicated meaning, and, further, the hydroxyl group on the carbon atom is optionally etherified or esterified with an aliphatic or cycloaliphatic compound.

To manufacture compounds of the formula (II), (1) a perfluoroalkylalkylmonocarboxylic acid of the formula (XV)  R—(CH$_2$)$_p$—COOH, wherein R and p have the indicated meaning, is reacted with (2) an epoxide of the formula (XIV), and an etherification or esterification is optionally carried out as indicated above.

In the manufacture of compounds of the formula (III), epoxides of the formula (XVI) 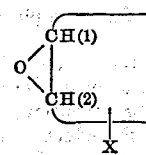

wherein $A_1$, $A_2$, $Y_3$ and X have the indicated meaning, are used.

Compounds of the formula (VII) are obtained through the use of epoxides of the formula

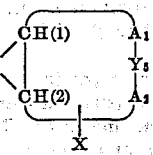

(XVII)

wherein $A_1$, $A_2$, $Y_5$ and X have the indicated meaning, as component (2).

Esterification of a perfluoroalkylalkylmonocarboxylic acid (1) of the formula (XVIII)  R—(CH$_2$)$_{p_1}$—COOH with an epoxide of the formula (XIX) 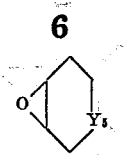

or (XX) 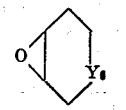

wherein R, $p_1$, $Y_5$ and $Y_6$ have the indicated meaning, yields compounds of the formula (VIIIa) or (VIIIb).

On using an epoxide of the formula (XXI) 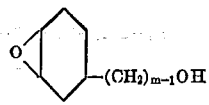

wherein m is 1 or 2, compounds of the formula (X) are obtained.

As further epoxides which can be used for the manufacture of perfluoroalkylalkylmonocarboxylic acid esters according to the invention, there may for example be mentioned those of the following formulae:

(XXIIa) 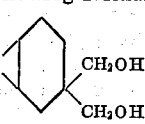

(XXIIb) 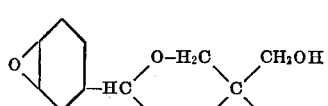

(XXIIc) 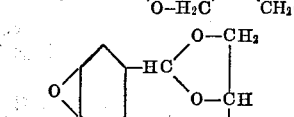

(XXIId) 

(XXIIe) 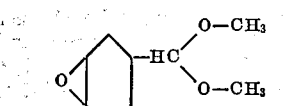

(XXIIf) 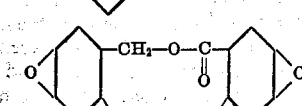

(XXIIg) 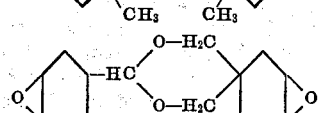

(XXIIh) 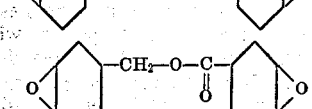

(XXIIi) 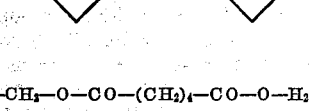

(XXIIj) 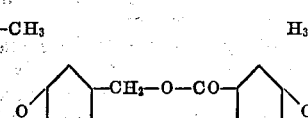

(XXIIk) 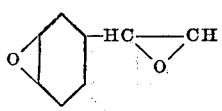

(XXIII) 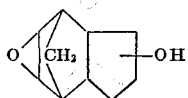

(XXIIm) 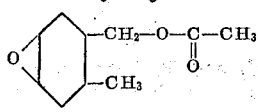

(XXIIn) 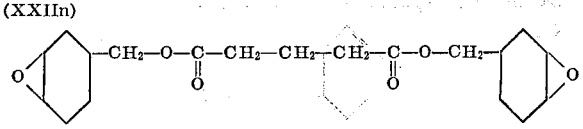

The compound of the formula (XIa) or (XIb) is obtained by reaction of (1) 2,2,3,3-H-pentadecafluorodecylic acid with (2) 3-epoxytetrahydrobenzyl alcohol.

Perfluoroalkylalkylmonocarboxylic acid esters, wherein the second hydroxyl group is etherified or esterified, can also be manufactured by first esterifying the hydroxyepoxide with a perfluoroalkylalkylmonocarboxylic acid and only subsequently carrying out further reactions at the second hydroxyl group. Compounds of the formula (III), wherein $Y_3$ represents a radical of the formula (3) 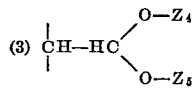

are for example obtained by reaction of the corresponding aldehyde with a polyhydric alcohol, such as for example glycerine or pentaerythritol.

If the process used is that wherein the epoxide is first reacted with a perfluoroalkylalkylmonocarboxylic acid and only subsequently etherified or esterified, it is also possible to obtain products which are additionally also esterified or etherified at the hydroxyl group which is in the adjacent position to the perfluoroalkylalkylmonocarboxylic acid ester group.

The perfluoroalkylalkylmonocarboxylic acids used for the manufacture of the perfluoro compounds according to the invention preferably contain 5 to 11, or especially 7 to 9, carbon atoms in the perfluoro alkyl radical.

The reaction of the components (1) and (2) is preferably carried out in an organic solvent, such as for example ethyl acetate, and appropriately in the presence of a catalyst, such as, for example, anhydrous sodium acetate. Preferably, the reaction is carried out at a temperature of 20 to 70° C., especially at 40 to 60° C.

Depending on the nature of the reactants and on the reaction conditions, the reaction requires 1 to 24 hours; it is, however, generally complete after 4 to 8 hours.

As a result of the presence of free hydroxyl groups, the perfluoroalkylalkylmonocarboxylic acid esters according to the invention react with compounds which contain several functional groups capable of reaction with hydroxyl groups, such as 1,2-epoxide groups, isocyanate groups, acrylic groups, methylol groups, methylol groups etherified with lower alcohols, aldehyde groups, easily hydrolysable ester groups and the like. Such polyfunctional compounds are therefore suitable for use as crosslinking components or curing components for the perfluoroalkylalkylmonocarboxylic acid esters, containing hydroxyl groups, according to the invention.

As such crosslinking components there may especially be mentioned: epoxide compounds, namely polyglycidyl ethers, such as butanediol diglycidyl ether and diglycidyl ether, diisocyanates and polyisocyanates, such as o-, m- and p-phenylenediisocyanate, toluylene - 2,4-diisocyanate and 1,5-naphthylenediisocyanate; acrylic compounds such as methylene-bis-acrylamide and symmetrical triacrylperhydrotriazine; poly-(2,3-dihydro-1,4-pyranyl) compounds such as (2,3-dihydro-1',4'-pyran-2'-yl)-methyl ester; aldehydes, such as formaldehyde or glyoxal, and soluble phenol-formaldehyde condensation products, such as novolacs or resols. Preferably, aminoplasts which are soluble in water or in organic solvents are used as crosslinking components.

Possible crosslinking components of this nature are formaldehyde condensation products of urea, thiourea, guanidine, acetylenediurea and dicyandiamide, and also of aminotriazines, such as melamine, or of guanamines, such as acetoguanamine, benzoguanamine, tetrahydrobenzoguanamine or formoguanamine, as well as their ethers with alcohols, such as methyl, ethyl, propyl, allyl, butyl, amyl or hexyl alcohol, cyclohexanol, benzyl, lauryl, stearyl, oleyl or abietyl alcohol. In addition to the ether radicals the condensation products can also contain radicals of higher-molecular acids, such as for example stearic acid.

Particularly good technical results in the field of textile finishing are obtained when using water-soluble condensation products of formaldehyde and melamine or especially with an esterification product or etherification product of hexamethylolmelamine-methyl-ether and stearic acid or stearyl alcohol as crosslinking components.

The perfluoroalkylalkylmonocarboxylic acid esters can also be used as a mixture with polymers not containing fluorine. Very suitable polymers not containing fluorine are in this case, for example, the homopolymers of acrylic or methacrylic acid esters, such as poly(ethyl acrylate) or copolymers of acrylic or methacrylic acid esters with methylolacrylamide or methylolmethacrylamide.

Because of their reactive groupings, the perfluoroalkylalkylmonocarboxylic acid esters according to the invention can be used for the treatment of porous and non-porous substrates, preferably for producing oleophobic finishes thereof, the esters being incorporated into the material in question or above all being applied to its surface. By porous substrates there are to be understood leather or preferably fibre materials such as textiles and paper, whilst possible non-porous materials are plastics and above all surfaces of metals and especially of glass.

The finishing of the substrate with the perfluoroalkylalkylmonocarboxylic acid esters according to the invention can be carried out in a separate process stage, but also in the same process stage as the application of further finishing agents, for example together with known agents for conferring hydrophobic properties, such as paraffin emulsions, or solutions or emulsions of fatty acid condensation products, for example with aminoplast precondensates.

Furthermore, a so-called "soil release" and "anti-soiling" effect can also be achieved with the perfluoro compounds according to the invention, especially on cotton.

Simultaneously with the effect of imparting oleophobic properties perfluoro compounds containing hydroxyl groups also display hydrophilic properties. For imparting oleophobic properties, the substrates can be treated either with solutions or with dispersions or emulsions of the perfluoro compounds. The perfluoroalkylalkylmonocarboxylic acid esters can, for example, also be applied to the textile material as a solution in an organic solvent and can be thermally fixed to the fabric after evaporation of the solvent.

Textile materials are of particular interest for finishing by means of the perfluoroalkylalkylmonocarboxylic acid esters according to the invention. Textile materials, for example, include those of native or regenerated cellulose, such as cotton, linen or rayon, staple viscose or cellulose acetate. However, textiles of wool, synthetic polyamides, polyesters or polyacrylonitrile can also be used. Mixed woven fabrics or mixed knitted fabrics of cotton-polyester fibres can also be finished advantageously. The textiles can in these cases be in the form of filaments, fibres or flocks, but preferably of woven fabrics or knitted fabrics.

Preparations which contain the perfluoro compounds according to the invention can be applied to the substrate in the customary manner which is in itself known. Woven fabrics can, for example, be impregnated by the exhaustion process or on a padder which is charged with the preparation at room temperature. The impregnated material is thereafter dried at 60 to 120° C. and is subsequently optionally still subjected to a heat treatment at above 100° C., for example at 120 to 200° C.

The textiles thus treated show an oil-repellent effect and where the preparation also contains an agent for imparting hydrophobic properties, this effect is coupled with a water-repellent effect.

EXAMPLE 1

14.0 g. of 3-epoxytetrahydrobenzyl alcohol together with 22.1 g. of 2,2,3,3-H-pentadecafluorodecylic acid are dissolved in 100 ml. of ethyl acetate, with the addition of 1 g. of anhydrous sodium acetate, at room temperature. The temperature rises to 25° C. The reaction temperature is kept constant at 40° C. and after 18 hours' reaction the epoxide content is 0%. The solution is concentrated in vacuo at 40° C. The residue is taken up in 100 ml. of diethyl ether and washed three times with 20 ml. of water, and yields a light yellow, viscous phase. Weight 19.3 g.=67.48% of theory.

The structure is confirmed by recording a mass spectrum, in that this shows a molecular weight of 570, which corresponds to a product of the formula (101)
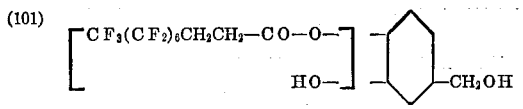

EXAMPLE 2

28.0 g. of 3-epoxytetrahydrobenzyl alcohol, 72 g. of perfluoroalkylalkylmonocarboxylic acid [1, 2], and 1 g. of sodium acetate (anhydrous) are dissolved in 200 ml. of ethyl acetate. The reaction is kept at 70° C. for 10 hours, thereafter the solvent is removed in vacuo, the residue is taken up in 200 ml. of diethyl ether, the solution is washed 3 times with 20 ml. of $H_2O$, and dried, and the ether is removed in vacuo.

60.4 g. of a brown paste are obtained, corresponding to a yield of 100%. The structure is confirmed by recording a mass spectrum, in that this shows molecular weights (M) of 520, 620 and 720, which corresponds to a compound of the formula (102)
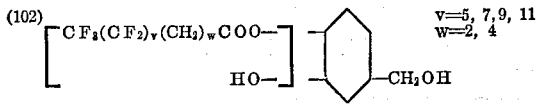
$v=5, 7, 9, 11$
$w=2, 4$

EXAMPLE 3

10.25 g. of an epoxide of the formula (XXIIh) and 20 g. of perfluoroalkylalkylmonocarboxylic acid [3], together with 2 g. of sodium acetate (anhydrous), are dissolved in 250 ml. of ethyl acetate. The reaction is kept at 75° C. for 16 hours, the sodium acetate is thereafter filtered off, and the solvent is removed in vacuo. 36% of the original epoxide groups can still be detected by titration. Yield 25 g.=82.6% of a yellow resin. The structure is confirmed by recording a mass spectrum, in that this shows molecular weights of 744, 844, 772 and 872, which corresponds to the formula (103.1)
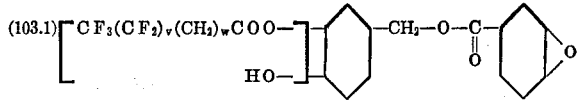

or (103.2)
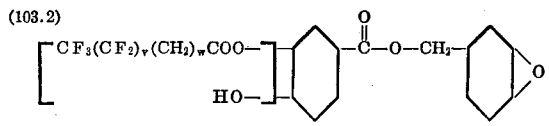

$v=7, 9$; $w=2, 4$

The resin further contains, as by-products, compounds with an opened epoxide group.

EXAMPLE 4

5.38 g. of epoxide of the formula (XXIIk) and 20 g. of perfluoroalkylalkylmonocarboxylic acid [4] together with 1 g. of sodium acetate are dissolved in 150 ml. of ethyl acetate. The reaction is kept at 70° C. for 12 hours, thereafter the solvent is removed in vacuo, the residue is taken up in 200 ml. of diethyl ether, the solution is washed three times with 20 ml. of water and dried, and the ether is removed in vacuo. 24% of the original epoxide groups can still be detected. Yield 20.5 g.= 80.77% of a brown resin. The structure is confirmed by recording a mass spectrum, in that this shows molecular weights of 732, 660, 760 and 688, which corresponds to a product of the formula (104.1)
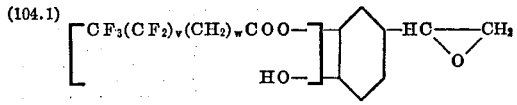

or (104.2)
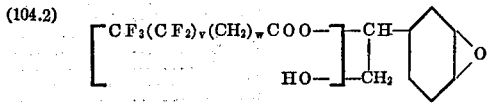

$v=7, 9, 11$; $w=2, 4, 6$

As a by-product, the brown resin also contains compounds with an opened epoxide group.

EXAMPLE 5

12.8 g. of 3-epoxytetrahydrobenzyl alcohol together with 60.4 g. of perfluoroalkyldecylcarboxylic acid [5] and

---

[1] The perfluoroalkylalkylmonocarboxylic acid used has the following composition, according to the gas chromatogram and the mass spectrum:

| | M | compound of the formula (102) |
|---|---|---|
| 20% of $C_6F_{13}C_2H_4COOH$ | —M 392 | 520 |
| 40% of $C_8F_{17}C_2H_4COOH$ | —M 492 | 620 |
| 30% of $C_{10}F_{21}C_2H_4COOH$ | —M 592 | 720 |
| 10% of $C_{12}F_{25}C_2H_4COOH$ | —M 692 | |

[2] On repeating Example 2, an acid of the following composition is used:
19% of $C_8F_{17}C_2H_4COOH$—M 492
40.5% of $C_{10}F_{21}C_2H_4COOH$—M 592
20% of $C_8F_{17}C_4H_8COOH$—M 520
15% of $C_{10}F_{21}C_4H_8COOH$—M 620

[3] The perfluoroalkylalkylmonocarboxylic acid used has the same composition as given in Example 2 under footnote 2.

[4] The perfluoroalkylalkylmonocarboxylic acid used has the following composition, according to the gas chromatogram and mass spectrum:
16% of $CF_3(CF_2)_9C_2H_4COOH$—M 592
3% of $CF_3(CF_2)_{11}C_2H_4COOH$—M 692
2% of $CF_3(CF_2)_5C_2H_4COOH$—M 420
32% of $CF_3(CF_2)_7C_4H_8COOH$—M 520
34% of $CF_3(CF_2)_9C_4H_8COOH$—M 620
1% of $CF_3(CF_2)_5C_6H_{12}COOH$—M 448
11% of $CF_3(CF_2)_7C_6H_{12}COOH$—M 548

[5] The perfluoroalkyldecylcarboxylic acid used has the following composition:
25.2% of $CF_3(CF_2)_5(CH_2)_{10}COOH$—M 504
46.8% of $CF_3(CF_2)_7(CH_2)_{10}COOH$—M 604
22.1% of $CF_3(CF_2)_9(CH_2)_{10}COOH$—M 704

2.0 g. of sodium acetate (anhydrous) are dissolved in 400 ml. of ethyl acetate and the reaction is carried out as described in Example 2. Yield 50.0 g.=68.3% of theory. The product is a hard, brown wax. The structure is confirmed by recording a mass spectrum, in that molecular weights of 632, 732 and 832 are found, which corresponds to the following formula (105)
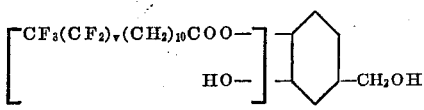

$v = 5, 7, 9$

EXAMPLE 6

12.8 g. of 3-epoxytetrahydrobenzyl alcohol together with 54.6 g. of perfluoroalkylcyclohexylcarboxylic acid [6] and 2.0 g. of sodium acetate (anhydrous) are dissolved in 400 ml. of ethyl acetate, and the reaction is carried out as described in Example 2. Yield 41.6 g.=61.72% of theory. The product is waxy. The structure is confirmed by recording a mass spectrum, in that this shows molecular weights of 574, 674 and 774, which corresponds to the following formula (106)
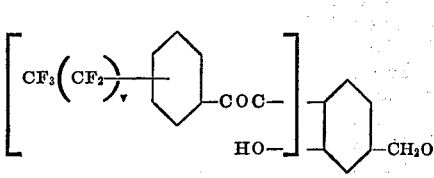

$v = 5, 7, 9$

EXAMPLE 7

2 g. of the end product according to Example 1 together with 0.1 g. of critic acid and 0.1 g. of $MgCl_2$ (in 0.5 g. of water) are dissolved in 10 ml. of ethyl acetate.

Woven pieces of cotton, cotton-polyester, synthetic polyamide, polyester and wool are successively dipped into this solution and thus impregnated with the perfluoro compound. A piece of filter paper is also impregnated in this way. The fabric samples and paper sample are thereafter dried for 10 minutes at 100° C.

The assessment of the oil-repellent effect is carried out according to the so-called "3 M oil repellency test" [Crajeck and Petersen, Textile Research Journal *32*, 320–331 (1960)], using heptane-Nujol mixtures. In the assessment, 150 denotes the best achievable rating. The individual samples are assessed immediately after drying, that is to say as obtained, and after washing in boiling trichloroethylene for 5 minutes. The results are summarised in the table below.

| Substrate | Assessment | Rating |
|---|---|---|
| Cotton | As obtained | 120 |
|  | After washing in trichloroethylene | 90 |
| Cotton/polyester | As obtained | 130 |
|  | After washing in trichloroethylene | 90 |
| Polyester | As obtained | 130 |
|  | After washing in trichloroethylene | 90 |
| Polyamide | As obtained | 120 |
|  | After washing in trichloroethylene | 90 |
| Wool | As obtained | 100 |
|  | After washing in trichloroethylene | 70 |
| Paper | As obtained | 130 |

EXAMPLE 8

The following liquors are prepared from the products of Examples 2 to 6, and tested:

| | Liquors (concentrations in g./l.) | | | | | | | | | |
|---|---|---|---|---|---|---|---|---|---|---|
| | A | B | C | D | E | F | G | H | I | J |
| Constituents: | | | | | | | | | | |
| Product from example: | | | | | | | | | | |
| 2 | 60 | 100 | 6 | 20 | | | | | | |
| 3 | | | | | 20 | | | | | |
| 4 | | | | | | 4 | 10 | 20 | | |
| 5 | | | | | | | | | 30 | |
| 6 | | | | | | | | | | 30 |
| (1) | | | | | | 30 | 30 | | | |
| Dimethylglyoxalmonourein | | | | | 30 | | | | | |
| Polyoctyl methacrylate | 30 | 30 | 30 | | | | | | | |
| Butadienestyrene latex | 16 | 16 | 16 | | | | | | | |
| Water | | | | | | 500 | 500 | 500 | | |
| Ethanol | | | | 1,000 | 1,000 | 500 | 500 | 500 | | |
| Dioxane | | | | | | | | | | 1,000 |
| n-Butanol | 750 | 750 | 750 | | | | | | 750 | |
| Acetone | 250 | 250 | 250 | | | | | | 250 | |
| Chloroacetic acid | 3 | 3 | 3 | 3 | 3 | 3 | 3 | 3 | 3 | 3 |

[1] 50% strength aqueous solution of 1 mol of hexamethylolmelamine-hexamethyl-ether and 1 mol of dimethylolethyleneurea.

[6] The perfluoroalkylcyclohexylcarboxylic acid used has the following composition

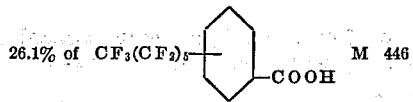
26.1% of $CF_3(CF_2)_5$— M 446

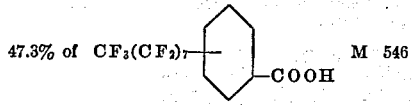
47.3% of $CF_3(CF_2)_7$— M 546

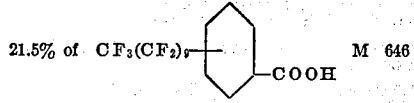
21.5% of $CF_3(CF_2)_9$— M 646

Woven pieces of cotton and cotton-polyester are successively dipped into these liquors, and thus impregnated with the perfluoro compounds. The fabric samples are thereafter dried for 5 minutes at 140° C. in vacuo. The oil-repellent effect is assessed as indicated in Example 7, but the oleophobic character is in part also tested after 1, 5 and 10 SNV-3 washes.

SNV-3 wash: wash for 30 minutes at 60° C. in a washing liquor which contains 5 g. of soap and 2 g. of anhydrous sodium carbonate per litre, using a liquor ratio of 1:50. The results are summarised in the following table.

| Substrate and assessment after washes | Treated with liquor | | | | | | | | | |
|---|---|---|---|---|---|---|---|---|---|---|
| | A | B | C | D | E | F | G | H | I | J |
| Cotton: | | | | | | | | | | |
| 1×SNV-3 | 100 | 100 | 60 | 110 | 100 | 100 | 120 | 120 | 100 | 90 |
| 5×SNV-3 | 60 | 60 | 60 | 70 | | 80 | 110 | 120 | 90 | 90 |
| 10×SNV-3 | 60 | 60 | 60 | | 80 | | | | | |
| 1×Trichloroethylene | 100 | 110 | 60 | | | | | | | |
| Cotton/polyester: | | | | | | | | | | |
| 1×SNV-3 | 100 | 110 | 60 | 100 | 90 | 80 | 120 | 120 | 100 | 90 |
| 5×SNV-3 | 60 | 60 | 60 | 70 | | | 120 | 120 | 80 | 80 |
| 10×SNV-3 | 60 | 60 | 60 | | 80 | 60 | | | | |
| 1×Trichloroethylene | 90 | 100 | 60 | | | | | | | |

Cotton-polyester fabrics which have been finished with liquor D, are additionally also tested with regard to the soil-release effectiveness of the finishes. In doing so, the test specimens are spotted with synthetic "skin grease" [Spangler, W. G., Cross, H. D., and Sohaafsma, B. R., J. Am. Oil Chem. Soc. 43, 723, (1965)]. The spots are applied before the first and fifth SNV-3 wash, and are thereafter assessed. Grading is according to ratings 1 to 5, wherein the rating 5 denotes "completely washed out" and the rating 1 denotes "not washed out," that is to say the best rating is 5.

Wash: Rating
1×SNV-3 ———————————————— 2
5×SNV-3 ———————————————— 2.5

I claim:

1. A perfluoroalkylmonocarboxylic acid ester of the formula

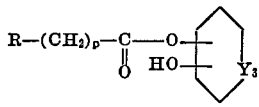

wherein R is a perfluoroalkyl of 4 to 14 carbon atoms, $p$ is 2, 3 or 4; $Y_3$ is a radical of the formula

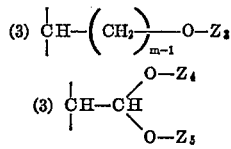

or

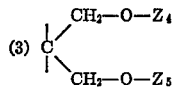

where $Z_3$ is hydrogen, alkyl or hydroxyalkyl of 1 to 18 carbon atoms, acetyl or a group of the formula

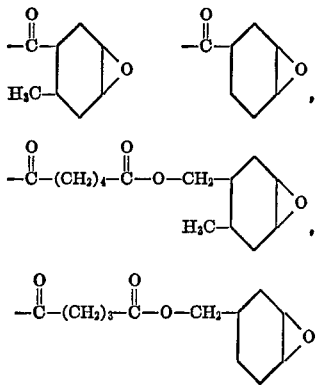

$Z_4$ and $Z_5$ each is hydrogen, alkyl, hydroxyalkyl or monoepoxyalkyl of 1 to 18 carbon atoms, or $Z_4$ and $Z_5$ together form

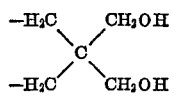

$m$ is 1 or 2 and the ester group and the OH group are each located para- or meta to $Y_3$ and C(3) represent the ring carbon atom located in the radical $Y_3$.

2. A prefluoroalkylmonocarboxylic acid ester according to claim 1 in which R contains 5 to 11 carbon atoms.

3. A perfluoroalkylmonocarboxylic acid ester according to claim 1 in which R contains 7 to 9 carbon atoms.

4. A perfluoroalkylmonocarboxylic acid ester according to claim 1 in which $Z_3$ is

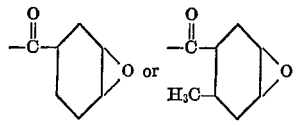

and $m$ is 2.

5. A perfluoroalkylmonocarboxylic acid ester of the formula

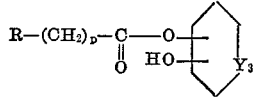

where

R is a perfluoroalkyl radical of 4 to 14 carbon atoms, $p$ is 2, 3 or 4,
the ester group and the OH group are each located para- or meta- to $Y_3$,
$Y_3$ is

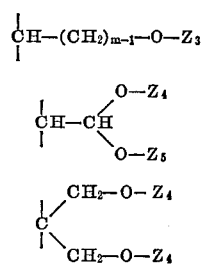

where
$Z_3$, $Z_4$ and $Z_5$ each is hydrogen or an alkyl or hydroxyalkyl radical of 1 to 5 carbon atoms, and $m$ is 1 or 2.

6. Perfluoroalkylalkylmonocarboxylic acid esters, characterised in that they correspond to the formula

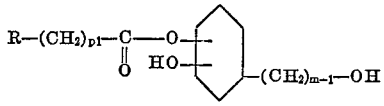

wherein R is a perfluoroalkyl radical having 4 to 14 carbon atoms and $p_1$ is an integer from 2 to 4, $m$ is 1 or 2, and the perfluoroalkylalkylmonocarboxylic acid radical and the hydroxyl group are in the 3- and 4-position, or 4- and 3-position.

7. The compound of the formula $$F_3C-(CF_2)_6-CH_2CH_2-\underset{\underset{O}{\parallel}}{C}-O-\bigcirc\!\!\!\overset{HO-}{\underset{CH_2-OH}{}}$$

or $$F_3C-(CF_2)_6-CH_2CH_2-\underset{\underset{O}{\parallel}}{C}-O-\bigcirc\!\!\!\overset{HO-}{\underset{}{}}-CH_2-OH$$

8. The compound of the formula $$F_3C-(CF_2)_k-CH_2CH_2-\underset{\underset{O}{\parallel}}{C}-O-\bigcirc\!\!\!\overset{}{\underset{HO-}{}}-CH_2OH$$

or $$F_3C-(CF_2)_k-CH_2CH_2-\underset{\underset{O}{\parallel}}{C}-O-\bigcirc\!\!\!\overset{HO-}{\underset{}{}}-CH_2OH$$

wherein $k$ is an integer of 3 to 13.

9. A perfluoroalkylmonocarboxylic acid ester according to claim 4 of the formula $$\left[CF_3(CF_2)_v(CH_2)_wCOO-\bigcirc\!\!\!\overset{}{\underset{HO-}{}}\right]-CH_2-O-\underset{\underset{O}{\parallel}}{C}-\bigcirc\!\!\!\overset{}{\underset{}{}}\!\!\overset{O}{\triangleleft}$$

where
V is 7, or 9, and
W is 2, or 4.

10. A perfluoroalkylmonocarboxylic acid ester according to claim 1 of the formula $$\left[CF_3(CF_2)_v(CH_2)_wCOO-\bigcirc\!\!\!\overset{}{\underset{HO-}{}}\right]-\underset{\underset{O}{\parallel}}{C}-O-CH_2-\bigcirc\!\!\!\overset{O}{\triangleleft}$$

where V is 7 or 9 and W is 2 or 4.

11. A perfluoroalkylmonocarboxylic acid ester according to claim 1 of the formula $$\left[CF_3(CF_2)_6CH_2CH_2-CO-O-\bigcirc\!\!\!\overset{}{\underset{HO-}{}}\right]-CH_2OH$$

12. A perfluoroalkylmonocarboxylic acid ester according to claim 1 of the formula $$\left[CF_3(CF_2)_v(CH_2)_wCOO-\bigcirc\!\!\!\overset{}{\underset{HO-}{}}\right]-CH_2OH$$

wherein V is 5, 7, 9 or 11 and W is 2 or 4.

13. A perfluoroalkylmonocarboxylic acid ester according to claim 1 of the formula $$\left[CF_3(CF_2)_v(CH_2)_wCOO-\bigcirc\!\!\!\overset{}{\underset{HO-}{}}\right]-HC\!\!\overset{O}{\underset{}{\triangleleft}}\!\!CH_2$$

or $$\left[CF_3(CF_2)_v(CH_2)_wCOO-\bigcirc\!\!\!\overset{}{\underset{HO-}{}}\right]-\underset{CH_2}{\overset{CH}{}}\!\!\!\overset{O}{\triangleright}$$

wherein V is 7, 9 or 11 and W is 2, 4 or 6.

14. A perfluoroalkylmonocarboxylic acid ester according to claim 1 of the formula $$\left[CF_3(CF_2)_v(CH_2)_{10}COO-\bigcirc\!\!\!\overset{}{\underset{HO-}{}}\right]-CH_2OH$$

wherein V is 5, 7 or 9.

15. A perfluoroalkylmonocarboxylic acid ester according to claim 1 of the formula $$\left[CF_3(CF_2)_v\bigcirc\!\!\!\overset{}{\underset{}{}}-COO-\bigcirc\!\!\!\overset{}{\underset{HO-}{}}\right]-CH_2OH$$

wherein V is 5, 7 or 9.

References Cited
UNITED STATES PATENTS

| | | | |
|---|---|---|---|
| 3,340,295 | 9/1967 | Wheeler et al. | 260—486 |
| 3,433,824 | 3/1969 | Horsley | 260—476 |
| 2,856,388 | 10/1958 | Barnhart et al. | 260—78.4 |

ELBERT L. ROBERTS, Primary Examiner

D. G. RIVERS, Assistant Examiner

U.S. Cl. X.R.

260—340.5, 340.7, 348 A, 340.9, 468 J, 487, 485 F; 117—121, 124, 127, 138.8 F, 138.8 M, 138.8 UA, 141, 144, 154